Nov. 15, 1938.   J. A. BOYER   2,137,200
ABRASIVE ARTICLE AND ITS MANUFACTURE
Filed June 28, 1937

INVENTOR.
JOHN A. BOYER
BY
ATTORNEY.

Patented Nov. 15, 1938

2,137,200

UNITED STATES PATENT OFFICE 2,137,200

ABRASIVE ARTICLE AND ITS MANUFACTURE

John A. Boyer, Niagara Falls, N. Y., assignor to The Carborundum Company, Niagara Falls, N. Y., a corporation of Delaware Application June 28, 1937, Serial No. 150,765

6 Claims. (Cl. 51—280)

This invention relates to metal bonded abrasive articles and their manufacture, and particularly to the metal bonding of such abrasives as silicon carbide, boron carbide, fused alumina and diamonds. The invention is particularly applicable to the production of abrasive articles adapted for the cutting of extremely hard materials such as glass, tungsten carbide and other hard carbides.

One of the objects of the invention is the production of a metallic bond which can be readily molded under pressure and which can be sintered to a coherent mass under relatively low temperature. Another object is the production of a metal bond which can be sintered with comparatively little shrinkage even when formed under low consolidating pressures, and which permits the substantial retention of contour of the original pressed article. A further object of the invention is the production of a metallic abrasive article which will cut or grind hard materials such as glass or tungsten carbide with a comparatively small loss of abrasive. These and other objects will be apparent or will be hereinafter pointed out.

In the bonding of abrasives with metallic materials, it has been customary to use compositions which produce either a hard or a brittle matrix. Most of the materials used for this purpose have been characterized by relatively high melting points and, as they are comparatively hard or brittle, they have little or no plasticity at room temperature except under extremely high pressures. Such materials are difficult to mold and, unless very high consolidating pressures are used, the articles when cold molded and subsequently heated tend to shrink during the coalescence of the metal particles. As a result of this shrinkage, the original size and shape of the pressed article is not preserved.

The low melting metals, as for example those which melt below 700° C., are relatively soft, and for this reason they have not been regarded as suitable bonds for abrasive articles used in the grinding of hard materials.

In producing abrasive wheels and laps, I have found that sintered aluminum bonds, and particularly those containing intermetallic compounds as hardening agents, will satisfactorily retain abrasive grains during cutting and grinding, and that it is possible to form a relatively soft mix containing aluminum, mold the mix under a fairly low consolidating pressure, and thereafter produce a hardening effect by the reaction of the aluminum with other alloying agents to form intermetallic compounds.

If alloying agents capable of forming intermetallic compounds with the aluminum are added in proportions beyond those ordinarily used in structural aluminum base alloys, the resulting product when sintered contains an appreciable proportion of hard constituents which impart wear-resistance to the matrix. It is possible to obtain a hard matrix of this character even when the original mix from which the article is pressed is very soft and plastic. For example, a product which when sintered will consist almost entirely of a hard metallic compound can be produced from a mix containing approximately 70% of the relatively soft aluminum powder. This high content of aluminum in the original mix permits the deformation of the powder under pressure so as to form a dense mass.

In making abrasive articles by the process herein described, the abrasive grain of powder is mixed with powdered metal and the mixture molded and sintered. The article can be molded by the simultaneous application of heat and pressure or it can be cold molded and thereafter subjected to heat either with or without the application of pressure. As previously pointed out, a mix containing an appreciable proportion of free aluminum possesses the advantage that the aluminum is plastic and the mixture can be consolidated into a dense mass by the application of pressure alone. I believe that the plasticity of the aluminum and the density afforded by the deformation of the metal particles under pressure may at least in part account for the fact that, during sintering or alloying, such mixes are not characterized by a high shrinkage. When the powdered mix consists entirely of particles which are hard and can not readily be deformed by the pressure used for consolidation, the cold pressed material possesses considerable porosity, and upon heating to effect coalescence, the material shrinks. The preservation of contour without the application of pressure during sintering, which I have found to be characteristic of the aluminum base alloys of the type herein described, is of particular importance in the manufacture of curved laps such as are used for the grinding of lenses. With such laps the contour of the finished material must be predetermined and accurately maintained.

Commercial aluminum powder is ordinarily manufactured for use in paints, and the metal is frequently contaminated with stearic acid or other organic materials. Powder of this type is also quite flaky, and in pressing, tends to give a laminated structure. Although it is possible to use such a material for sintering, I have found it advantageous to employ aluminum powder of a non-flaky character, that is, substantially developed in three dimensions. Such a material can be manufactured by comminuting the aluminum or the aluminum alloy to be used for sintering by spraying, or by a cutting or milling operation. A form of aluminum powder very desirable for sintering, when examined under the microscope, has the appearance of irregular shaped particles or chips, which may be more or less elongated in one direction but are not flaky. The particle size is preferably less than approximately 200 mesh. The material should be as free as possible from organic materials or oxide on the surface of the particles, and in the preferred form is not unctuous or adherent as is the case with the usual commercial powder. It is possible to obtain aluminum powder in which the particle surfaces are practically oxide free, and this material is very desirable for sintering.

The exact nature of the invention will be more clearly understood from the following detailed description, considered in connection with the accompanying drawing.

Figure 1:
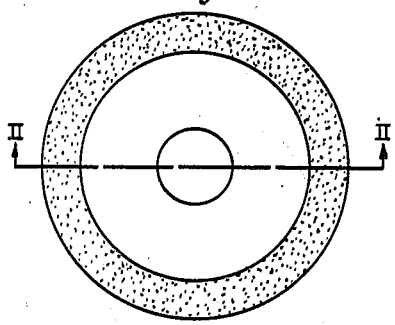
Figure 1 shows an abrasive ring or disc of a type adapted for grinding tungsten carbide tools.
Figure 2:
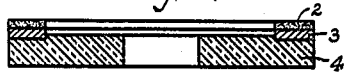
Figure 2 is a section of the disc shown in Figure 1, the section being taken along the section line II—II.

A method of making an abrasive wheel of the type shown in Figures 1 and 2, can be illustrated by a specific example, although it will be understood that other compositions and methods of molding and sintering can be used. A mixture of for example 10% diamonds of from 80 to 140 grit, 10% silicon carbide of from 180 to about 600 grit, and 80% of powdered metal is introduced into the mold to form the cutting surface 2. If the metal consists of ingredients to be alloyed, it is thoroughly mixed, screened, and mixed with the abrasive. The mix containing the diamonds is accurately leveled off, and a backing mixture of 20% silicon carbide and 80% metal powder is added to the mold to form the backing 3. If the material is to be cold molded, the entire mass is then pressed into a ring under a pressure of, for example, from 10,000 to 40,000 lbs./sq. in. This ring, after removal from the mold, can be sintered in an atmosphere which is non-reactive with respect to aluminum at the temperature used, without the application of further consolidating pressure. It is desirable, however, to apply a slight pressure to the ring during sintering in order to prevent warping. Although aluminum melts at 660° C., the material can be heated to a temperature very closely approximating the melting point, and in some cases even slightly above the melting point, without loss of shape. At this temperature coalescence or alloying of the particles of metal powder into a strong body can be readily effected. It is possible, however, to obtain a strong sintered article without reaching the melting temperature of the aluminum, and such a product is produced by the diffusion of the solid particles of metal into each other so as to form a coherent mass.

After the ring has been sintered, it is ready for mounting upon a suitable backing so that it can be used as an abrasive wheel or lap. The backing 4 indicated in Figure 2 may be a reversible thermoplastic resin, or a backing of metal can be used, and the sintered ring soldered to the metal.

Figure 3:
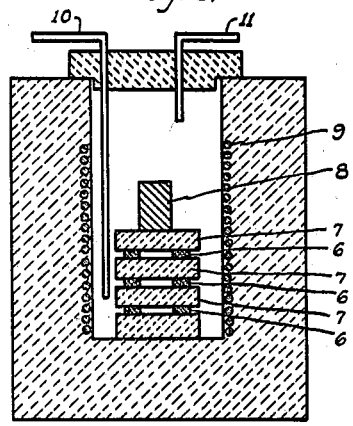
Figure 3 illustrates a method of firing a number of flat discs or rings.

A convenient method of sintering wheels of the general type shown in Figures 1 and 2 is illustrated in Figure 3. In this figure, the wheels 6 are spaced between ceramic bats 7 and a weight 8 is placed upon the top of the uppermost bat to exert sufficient pressure to prevent warping during sintering. The furnace is heated by a wire wound resistor 9; an inert gas is introduced into the furnace through the pipe 10 and the excess gas escapes through the pipe 11.

A number of different atmospheres can be used for the sintering operation, the simplest and most convenient being ordinary illuminating gas. Helium and argon are also very satisfactory. If desired, the wheels can be sintered under vacuum.

Figure 4:
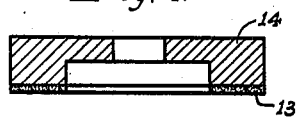
Figure 4 illustrates a metal cup wheel which can be used for the surfacing of refractories, particularly those composed of silicon carbide, which are difficult to cut by other methods.

Figure 4 shows a section of a cup wheel which has been found suitable for the surfacing of refractories such as silicon carbide or fire clay bricks and shapes. The abrasive layer 13 may consist of diamonds bonded with metal or a mixture of diamonds, silicon carbide or other abrasive, and metal. The backing 14 can be of resin, metal or any suitable material. Sintered aluminum base alloy bonds and particularly those containing intermetallic compounds, have been found very satisfactory for wheels of this type.

In the case of metal bonded diamond wheels, and particularly those used for cutting or lapping glass, it is possible to use a relatively soft sintered bond providing there is sufficient abrasive to make the surface of the material wear-resistant. In such cases, the bond is more or less resilient and during grinding or lapping the abrasive acts much as the hard particles in a bearing metal. The wear is taken almost entirely by the hard particles embedded in the resilient matrix and the metal, even though soft, is not worn away. I have found it to advantage to include with the diamonds a certain proportion of other abrasives such as silicon carbide, boron carbide or fused alumina in order to increase the wear-resistant properties of the wheel. This additional abrasive may be somewhat finer in grit size than the diamonds, although with the finer grit diamond wheels this is not always necessary. The additional abrasive when distributed throughout the metal matrix stiffens the metal and makes it very resistant to wear or abrasion. Thus, even in cases when the additional abrasive does no cutting whatever (as when the wheel is used for cutting tungsten carbide, which is practically as hard as the additional abrasive itself), it reduces the wheel loss, which under ordinary conditions is due at least in part to the "undercutting" or tearing out of the metal matrix surrounding the diamonds.

The addition of materials such as silicon carbide, boron carbide or fused alumina, quartz or glass to the mix makes possible the use of a fairly low percentage of diamonds to do the cutting, with very little wear of the surrounding matrix. The action of the softer abrasive in making the matrix resistant to wear is of special importance in the cutting of glass, silicon carbide or other hard materials which readily chip and form detritus which has an abrasive action upon the metal of the wheel.

Figure 5:
Figure 5 is a section of a glass grinding disc or lap of the type used for grinding lenses.

A section of a wheel which can be used for the grinding of lenses, in which the bond can be sintered aluminum or a sintered aluminum alloy, is shown in Figure 5. Such a wheel can be made by the method described in connection with the production of wheels of the type shown in Figures 1 and 2. The layer 16 containing the diamonds is first introduced into the mold and leveled off, and the mix to form the backing 17 then added. The backing layer may consist either of powdered metal or a mixture of powdered metal and an abrasive or filler cheaper than diamonds. The addition of an equivalent quantity of abrasive to the backing tends to give the same shrinkage to the backing as to the surface layer containing the diamonds, and minimizes warping.

Figure 6:
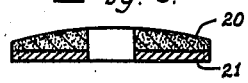
Figure 6 illustrates the contours obtained in sintering a lens grinding disc, the mixtures used being an aluminum base alloy and a copper base alloy respectively.

Figure 6 shows diagrammatically the contour obtained with the type of wheel shown in Figure 5, with the use of sintered aluminum base alloy and a copper-tin alloy respectively. The contour 20 (representing approximately that of the article as originally pressed) was obtained with a powdered mixture of 5% diamonds, 10% silicon carbide and 76.5% powdered aluminum and 8.5% copper, and a backing of the same composition except that the diamonds were replaced by an equivalent quantity of silicon carbide. The contour 21 represented by dotted lines was obtained from a composition containing 5% diamonds, 10% silicon carbide, 76.5% copper and 8.5% tin, with a similar backing in which the diamonds were replaced by silicon carbide. In contrast with the contour obtained with the aluminum alloy, the contour obtained with the copper alloy departs considerably from that of the original pressed article.

Figure 7:
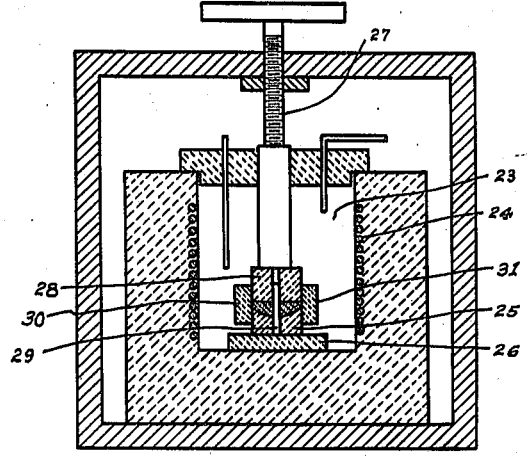
Figure 7 shows a section of a furnace adapted for the production of lens grinding discs under pressure.

Figure 7 shows diagrammatically a method of sintering a lens grinding disc having a grinding surface of metal bonded diamonds, in which pressure is applied during the sintering process. The furnace chamber 23 is heated by the wire wound resistance element 24, and the mold 25 is placed upon a support 26 resting upon the bottom of the furnace. Pressure is applied by means of the screw jack 27. The mold plunger consists of a cylinder 28 which is bored to receive the pin 29. This pin also extends through the bottom or curved portion of the mold. In assembling the mold, the pin and the outer ring 30 are placed in position with respect to the curved portion 25, the powdered mix 31 is introduced into the mold around the pin 29, and the cylindrical plunger 28 is then inserted so as to fit into the ring and at the same time surround the upper portion of the central pin. The mold parts are preferably made of graphite or carbon, but can be made of heat resistant metal. The mix can be compressed during the heating process from loose powder, but it is desirable to preform the article by cold pressing before the combined application of pressure and heat. This latter procedure results in a very dense article.

For most purposes, it is desirable to form a somewhat harder matrix than that afforded by the usual aluminum base alloys and for this purpose metals which form hard intermetallic compounds with aluminum can be introduced into the mix. For this purpose, the following mixture of metal powders can be used:

Aluminum-copper, 10% to 20% copper.
Aluminum-nickel, 5% to 20% nickel.
Aluminum-iron, 5% to 15% iron.
Aluminum-magnesium, 10% to 25% magnesium.

In the above compositions the percentages are given merely as examples and it will be understood that the hardness of the matrix will vary with the amount of the addition agent used.

Ternary mixtures of metal powder can also be used in which an intermetallic compound is formed from other metals than the aluminum. Examples of such mixtures are aluminum, magnesium and silicon, in which the magnesium and silicon react to form a compound $Mg_2Si$, which hardens the aluminum matrix.

When a very hard matrix is desired, the aluminum can be combined with other metals to form a composition containing a relatively high proportion of an intermetallic compound. Examples of such compounds are $CuAl_2$, $MnAl_2$, $FeAl_3$, $NiAl_3$ (or $NiAl$). Similar compounds with cobalt and magnesium exist; the exact composition of these compounds is not known with certainty, but the approximate formulae are $Mg_3Al_2$, $Mg_2Al_3$ and $Co_3Al_{13}$. The compositions required to produce varying percentages of these compounds can be easily deduced from stoichiometric relations involved in the formula of the compound. Some of the compounds, as for example, the copper compound, are quite brittle, and it is desirable to retain some free aluminum in the alloy composition so as to make the material resistant to impact or shock. Examples of satisfactory compositions are:

Aluminum, 20 to 40% nickel.
Aluminum, 20 to 40% cobalt.
Aluminum, 15 to 35% iron.

In sintering compositions containing intermetallic compounds from mixtures of powdered metals, it is possible to produce an entirely different structure from that obtained in a cast alloy of the same composition. In a cast alloy, crystal growth is free to take place in all directions, and the compound may often be in the form of a continuous brittle network, or in the form of large dendrites. In many cast alloys, the network of compound renders the material very brittle before the composition of the mass of alloy has become such that the whole mass is composed of an intermetallic compound. In alloys made from sintered powders, the intermetallic compound is usually intermingled with the pure metal (or a ductile solid solution in which the pure metal is the principal ingredient), and the structure is broken up to a greater extent than with a cast material. This structure makes possible a high degree of hardness without encountering the extreme brittleness characteristic of some of the pure compounds.

In using metal powder, it is also possible to get a much more uniform distribution of the abrasive than can be obtained in a cast alloy mixture.

In making a powdered mix the abrasive can be mixed with pure aluminum powder and the desired hardening agent in the proper proportions, or a mix can be made by using a certain proportion of previously alloyed material. With the harder alloys, especially with compositions containing very high percentages of high melting materials such as iron, cobalt and nickel, it is desirable to form at least a part of the mixture from material which has been previously alloyed. For this purpose a certain proportion of the pure intermetallic compound can be added to the mix. These compounds can be readily crushed and it is possible to make up alloys approximating the compound compositions, crush them to powder and then mix them with additional aluminum or with aluminum and a further quantity of compound-forming ingredient.

In addition to the abrasive articles illustrated and described, the sintered aluminum and aluminum alloy bonds herein described are adapted for peripheral grinding and cut off wheels for the grinding and cutting of glass, silicon carbide, terra cotta, and all varieties of refractory and abrasive materials, as well as tungsten carbide and other extremely hard alloys.

Although the above description has been primarily concerned with wheels containing diamonds, the bonds are applicable to the production of abrasive articles containing boron carbide either with or without an abrasive of a lower degree of hardness, and also to the bonding of silicon carbide and fused alumina. Abrasive laps containing boron carbide and silicon carbide have been found satisfactory for the lapping and cutting of glass, the surfacing of refractory articles and other similar operations. While the cutting rate is somewhat lower than that of the wheels containing diamonds, the greatly reduced cost makes such wheels commercially practicable.

By the term "intermetallic compound" is meant an alloy ingredient consisting of two or more metals in which the metals form a chemical compound characterized by homogeneity, a definite atomic ratio of each metal to each of the other metals, expressible in small integers, and chemical and physical properties different from any one of the constituent metals.

By the term "aluminum base alloy" is meant an alloy of aluminum and one or more other metals in which alloy the aluminum is predominant.

I claim:

1. An abrasive article consisting of abrasive comprising diamonds and a sintered bond therefor composed principally of aluminum and containing in an aluminum base alloy, a hardening agent consisting of an intermetallic compound of aluminum and another metal, in such an amount as to harden the bond but not to destroy its ductility.

2. An abrasive article consisting of abrasive comprising diamonds and a sintered bond therefor composed principally of aluminum and containing in an aluminum base alloy, a hardening agent consisting of an intermetallic compound of aluminum and a metal of the iron group, in such an amount as to harden the bond but not to destroy its ductility.

3. An abrasive article as set forth in claim 2 in which the hardening agent is an intermetallic compound of aluminum and nickel.

4. An abrasive article as set forth in claim 2 in which the hardening agent is an intermetallic compound of aluminum and cobalt.

5. An abrasive article as set forth in claim 2 in which the hardening agent is an intermetallic compound of aluminum and iron.

6. A raw mix for metal bonded abrasive articles consisting essentially of diamond abrasive and aluminum powder, the particles of said aluminum powder being irregular in shape, substantially developed in three dimensions and having their surfaces substantially free from oxide and organic materials.

JOHN A. BOYER.